United States Patent [19]

Crowder

[11] Patent Number: 4,650,325

[45] Date of Patent: Mar. 17, 1987

[54] LASER TRACKER DESIGNATOR

[75] Inventor: Kenneth I. Crowder, Brea, Calif.

[73] Assignee: Northrop Corporation, Hawthorne, Calif.

[21] Appl. No.: 699,973

[22] Filed: Feb. 8, 1985

[51] Int. Cl.[4] .......................... G01B 11/26; G01C 3/08
[52] U.S. Cl. .......................................... 356/152; 356/5
[58] Field of Search ............................ 356/152, 141, 5

[56] References Cited

U.S. PATENT DOCUMENTS

| | | | |
|---|---|---|---|
| 4,063,819 | 12/1977 | Hayes | 356/152 |
| 4,470,698 | 9/1984 | Green, Jr. et al. | 356/152 |
| 4,516,853 | 5/1985 | Pearson | 356/141 X |

*Primary Examiner*—Stephen C. Buczinski
*Assistant Examiner*—Linda J. Wallace
*Attorney, Agent, or Firm*—Terry J. Anderson; Michael B. Lachuk

[57] ABSTRACT

A laser source projects a main beam through a central hole formed in an optical wedge. A portion of the laser light is refracted through the wedge and forms an optical side lobe. By rotating the wedge the side lobe undergoes a conical scan enhancing the tracking capability of the laser beam. A laser range finder processes the reflected return of the conical scan from a target and establishes an error signal which is minimized when equal reflections are obtained at spaced points along the conical scan thereby establishing a tracking direction which is coincident with the optical center of the target.

10 Claims, 2 Drawing Figures

LASER TRACKER DESIGNATOR

The present invention relates to laser tracking systems and more particularly to a system employing a conical scanning optical side lobe for locating the optical center of a target.

BACKGROUND OF THE INVENTION

Laser trackers are used extensively in weapon control systems for tracking a target accurately. Before a target is satisfactorily acquired, the main beam of a laser tracker must be substantially coincident with the optical center of the target.

In the past, a number of prior art approaches have been employed for ensuring such an occurrence. In one known approach, a laser source undergoes a conical scanning motion in the vicinity of a target and an optical range finder determines when the scan is centered about the optical center of a target. However, in order to accomplish this, a precision planetary gearing system must be connected to the laser source which introduces a considerable cost factor as well as reliability concerns. Utmost precision is required due to the extremely narrow pencil beam generated by laser sources.

BRIEF DESCRIPTION OF THE PRESENT INVENTION

The present invention utilizes a unique and elegant approach to obtaining precise laser tracker alignment with a target.

In the present invention, an optical wedge is introduced between the laser source and the target, the wedge having a central aperture formed therein for permitting passage of the main beam and causing refraction of a portion of light from the main beam. By rotating the wedge, a small portion of the main laser beam is refracted to create a side lobe controlled by the wedge. As the wedge is rotated, the side lobe performs a conical scan about the main beam. By comparing the returns from a target, an error signal is derived which forms a command for a servo that moves the laser in a direction minimizing the error signal and signifies the laser main beam alignment with the optical center of the target. The laser is physically linked to the rotating wedge so that, as the laser is moved, the rotating wedge is moved with it. Relatively inexpensive and straightforward gearing is employed to rotate the wedge as opposed to the prior art planetary gearing system which causes the laser itself to undergo conical motion.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
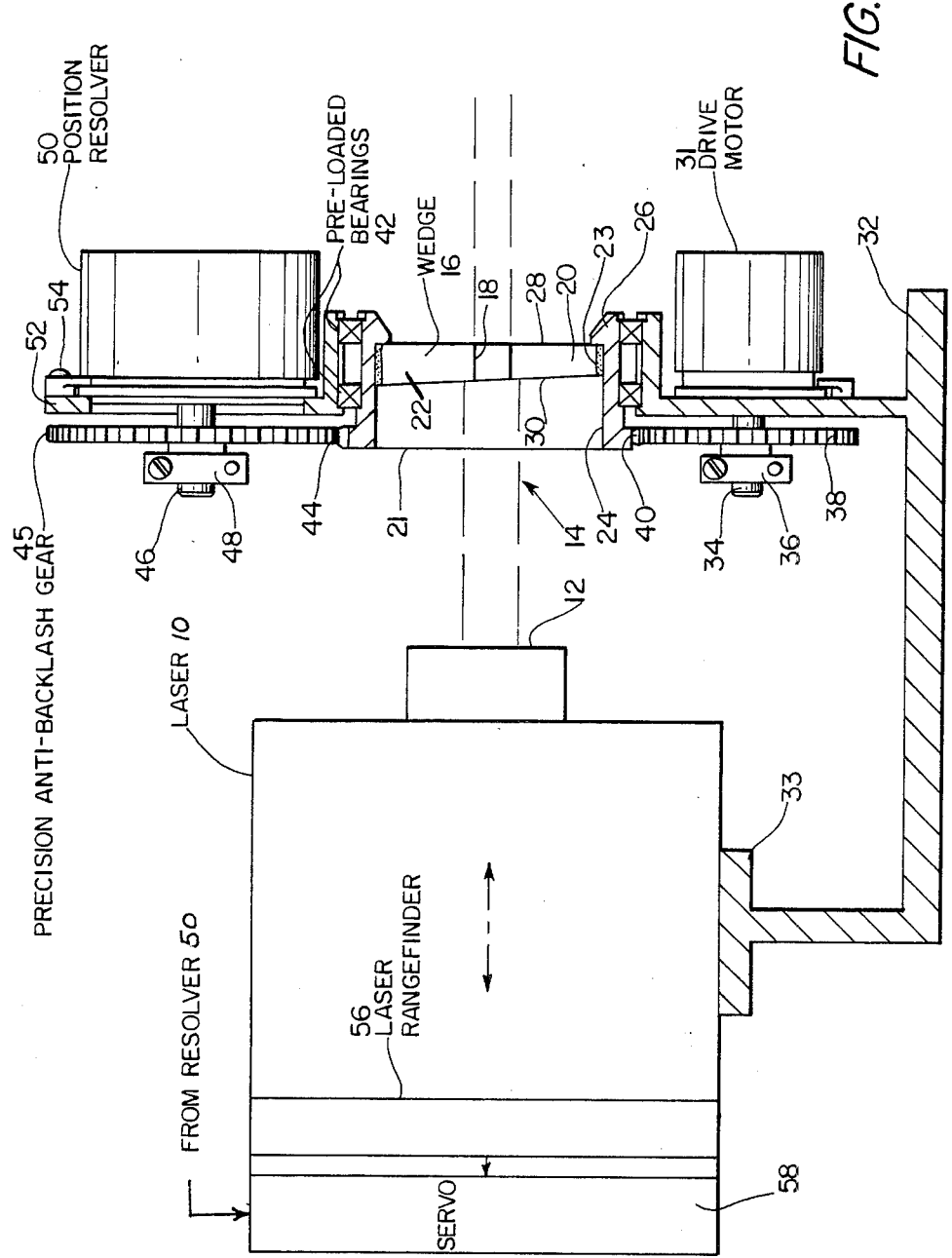
FIG. 1 is a sectional view of the drive mechanism employed in connection with the optical wedge of the present invention.

FIG. 1 illustrates the construction of the invention in detail. A laser generally indicated by reference numeral 10 emits a coherent pencil light beam 14 through aperture 12. A wedge 16 fabricated from optical glass has a central opening 18 formed therein through which a portion of the beam 14 passes in the direction of a tracked target. A portion of the light passing through wedge 16 is refracted at a relatively small angle from the beam 14 and, if wedge 16 is rotated, the refracted light serves as a side lobe undergoing a conical scan about the main beam 14.

Figure 2:
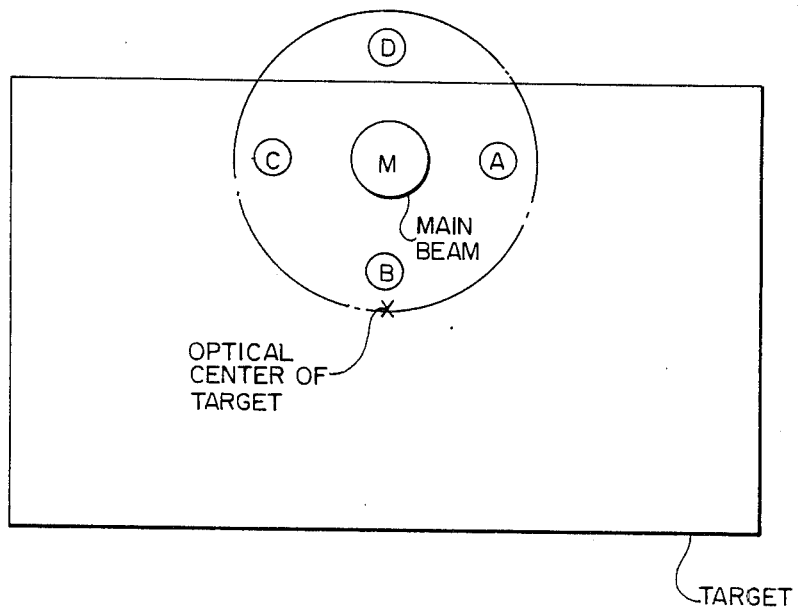
FIG. 2 is a diagrammatic illustration of the concept employed in the present invention.

In order to better appreciate this concept, reference is made to FIG. 2 wherein the beam 14 (FIG. 1) is represented at the central point M. At four evenly spaced time intervals, the optical side lobe of the refracted light assumes four evenly spaced circumferential positions which have been indicated, in the simplified figure, at points A, B, C and D. The profile of a tracked target is superimposed upon the profile of the main beam and side lobe scan points. As will be observed from studying FIG. 2, an imbalance of returned light will occur from vertically opposite points B and D due to the fact that point D falls outside the profile of the target. Light returns at horizontally opposite points A and C will be equal due to the existence of the target at both horizontal points A and C. A detection of the light imbalance at the various points creates an error signal, indicating the position of the main beam at a point higher than the optical center of the target, as demonstrated in FIG. 2. By repositioning the main beam downwardly, the generated error signal will decrease until the main beam approaches the optical center of the target.

In order to better understand how this is accomplished, reference is again made to FIG. 1 which illustrates the wedge 16 to include a thin portion 20 and a thicker portion 22 which accounts for the refraction of a portion of the main beam along a side lobe axis which is controlled to be within a relatively few degrees from the main beam. The wedge 16 further includes a planar rear surface 28, perpendicular to the main beam 14 and a surface 30 which forms an inclined surface of the wedge 16. The outer periphery 23 is cemented against the inner wall 24 of a ring gear 21. An annular shoulder 26 is formed in the ring gear to accurately position the wedge 16 relative to main beam 14.

In order to accomplish rotational motion of wedge 16, a drive motor 31, secured to fixed support 32, is employed. The motor shaft 34 is received within journal 36 and is keyed to a precision anti-backlash gear 38 which engages a matching gear 40 formed on the outside surface of ring gear 21. The ring gear 21 is supported by pre-loaded bearings 42. Support 32 is connected at 33 to the housing of laser 10 for achieving coupled motion of laser 10 and wedge 16 to establish a minimum error signal indicative of alignment with the optical center of a target. In order to determine the position of a generated side lobe which results from refracted laser light passing through wedge 16, a position resolver 50 follows the rotational motion of the wedge. The resolver is secured to a stationary flange 52 by means of a suitable fastener 54. A second anti-backlash gear 45 similar to 38 is keyed to shaft 46 which is itself retained in journal 48. The gearing engagement between gear 45 and ring gear 21 is indicated at reference numeral 44.

In operation of the device illustrated in FIG. 1, drive motor 31 causes rotation of gear 38 which meshes with ring gear 21. As the ring gear rotates, so does wedge 16 causing a conical scan of the refracted side lobe. Gearing between the ring gear 21 and anti-backlash gear 45 creates an electrical output from the position resolver 50 which corresponds to the angular position of the side lobe. Light reflected back from the main beam and the conically scanning side lobe is detected and measured by laser range finder 56, of conventional design. The output of the range finder is connected to a conventional servo 58 which has, as a second input, the output from resolver 50. Considering FIG. 2 again, at each of the indicated side lobe points A, B, C, and D, the return from the target is measured from the main beam and side lobe; and the points diametrically opposite one another are compared. For example, diametrically opposite returns (M+A) relative to (M+C) are measured. The returns are stored during an entire conical scan, after which they are refreshed on a cyclical basis. The results of the measurements at diametrically opposite points results in an error signal for driving servo 58 which in turn repositions laser 10 by means of gearing, linkages or other conventional motion translation devices, which need not be shown. As laser 10 is moved in accordance with the error signal, rotating wedge 16 and its related drive motor and resolver components are moved along with it so that optical alignment is ensured between main beam 14 and opening 18. By way of example, only about 10 percent of the total main beam energy emitted by the laser need be refracted to form a side lobe.

By virtue of the described invention, a system is presented which provides automatic tracking while maintaining the main beam on the target for designation in the environment of a laser homing weapon.

It should be understood that the invention is not limited to the exact details of construction shown and described herein for obvious modifications will occur to persons skilled in the art.

I claim:

1. In a laser tracking system, an optical side lobe generator comprising:
    a laser source for generating a main beam;
    an optical wedge having an aperture formed therein through which a portion of the main beam passes, a fraction of the main beam being refracted by the wedge to form a side lobe; and
    means for rotating the wedge about the main beam causing the side lobe to undergo conical scanning about the main beam.

2. The generator set forth in claim 1 together with means connected to the wedge for measuring its rotational displacement.

3. A laser tracking system comprising:
    a laser source for generating a main beam;
    an optical wedge having an aperture formed therein through which a portion of the main beam passes, a fraction of the main beam being refracted by the wedge to form a side lobe;
    means for rotating the wedge about the main beam causing the side lobe to undergo conical scanning about the main beam;
    means connected to the wedge for measuring its rotational displacement;
    range finding means located in an optical path coincident with light returned from a target illuminated by the main beam, the range finder means serving to determine imbalance of returned light relative to an optical center of the target.

4. The system set forth in claim 3 together with servo means having inputs connected to the output of the range finder and the measuring means for moving the laser source and the wedge in a direction minimizing the imbalances thereby aligning the main beam with the optical center of the target.

5. The system set forth in claim 4 wherein the measuring means comprises a position resolver.

6. The system set forth in claim 4 wherein the means for rotating the wedge comprises:
    a drive motor;
    gear means connected to the wedge;
    intermediate gear means connected between the motor and the wedge gear means for rotating the wedge.

7. The system set forth in claim 6 together with gear means interconnected with the wedge gear means for driving the resolver as the wedge rotates.

8. A method for tracking targets with a laser source comprising the steps:
    generating a main beam in the direction of a target;
    refracting a portion of the light from the main beam to form an optical side lobe;
    rotating the side lobe in a conical scan motion;
    measuring returned light at diametrically opposite points in the conical scan;
    generating an error signal indicative of the imbalance of returned light relative to an optic center of a tracked target.

9. The method set forth in claim 8 wherein the main beam passes light through the aperture of an optical wedge, and further wherein the wedge refracts a portion of the light from the main beam to form the optical side lobe.

10. The method set forth in claim 9 together with the step of rotating the wedge about the main beam to cause conical scanning of the side lobe.

* * * * *